Jan. 10, 1956   R. J. MEISINGER ET AL   2,730,404
LAWN SPRINKLER HOSE
Filed May 25, 1954
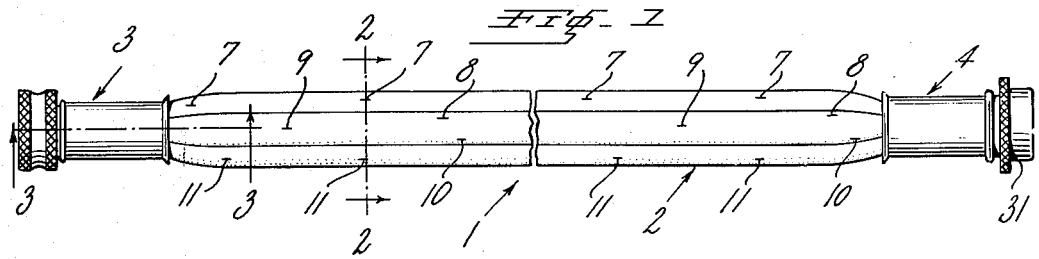
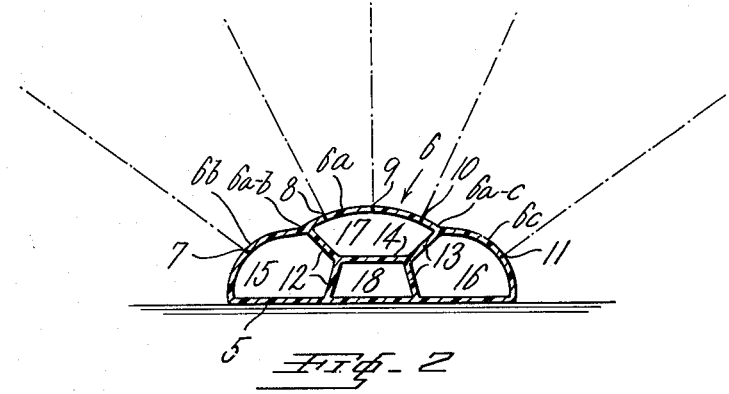
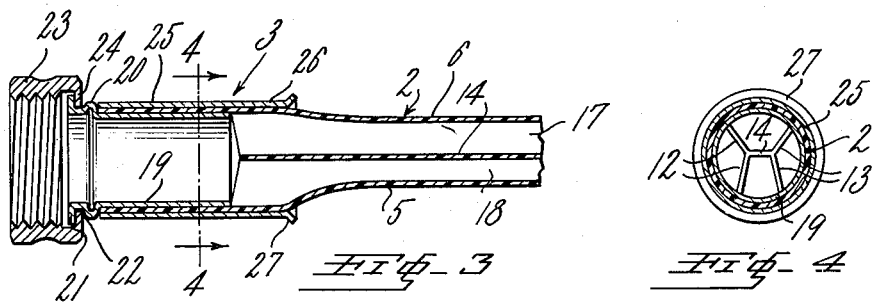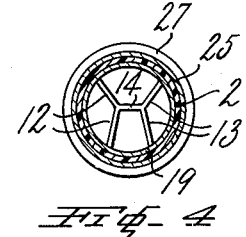
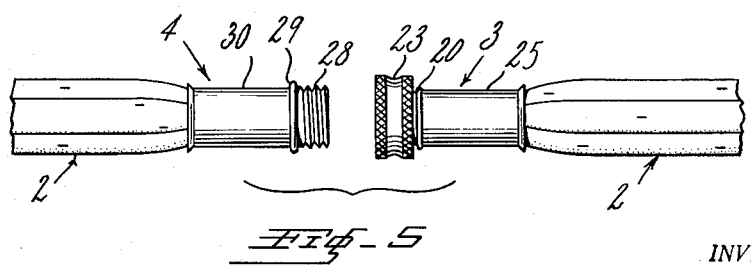
INVENTORS
JOHN T. DEMPSEY
RICHARD J. MEISINGER
BY Robert C. Weber
ATTORNEY

# United States Patent Office 2,730,404
Patented Jan. 10, 1956

2,730,404
LAWN SPRINKLER HOSE

Richard J. Meisinger, Saddle River, and John T. Dempsey, Belleville, N. J., assignors to United States Rubber Company, New York, N. Y., a corporation of New Jersey Application May 25, 1954, Serial No. 432,159

8 Claims. (Cl. 299—104)

The present invention relates to an improved sprinkler hose having a flat bottom wall and an arcuate perforated top wall which are internally reinforced in such a manner as to resist deformation by internal fluid pressure.

The present invention is particularly applicable to sprinkling and soaking of lawns; however, it will be understood that it may advantageously be employed for sprinkling and soaking many other plantings such as truck-gardens, flower beds, orchards, botanical gardens, athletic fields, irrigation areas or the like, and even for cooling the tops of buildings.

A primary object of the present invention is to provide a hose comprising an outer shell having a flat bottom wall which serves as a firm support to orientate the jets of water which issue from the top wall with respect to the ground and to prevent undesirable twisting and turning of the hose during use.

A further primary object of the invention is to provide a hose comprising an outer shell having an arcuate perforated top wall which is designed to properly direct the transverse jets of water and the top surface of which is free from longitudinal channels which would cause the water to be discharged in rivulets therefrom.

Another primary object of the invention is to provide a hose having an internal partitioning structure which divides the same into a plurality of passages and also reinforces said hose to resist deformation thereof.

A further primary object of the invention is to provide a hose having a plurality of passages in which the pressure is substantially uniform at any transverse section to prevent undesirable deformation of said hose and to cause the jets issuing from the orifices at any such section in said hose to be of substantially uniform intensity.

Another primary object is to provide a hose having a passage for boosting the water pressure adjacent the end of the hose remote from the inlet end, thereby providing a more uniform water jet intensity longitudinally of said hose and permitting the use of a larger number of orifices for greater water delivery and greater sprinkling or soaking area coverage.

A further primary object is to provide a hose having a female coupling at one end and a complementary male coupling at the other, each of which is constructed to prevent splitting of the partitioning structure and cutting of the hose upon bulging or flexure, and to provide for connection or disconnection of a plurality of hose sections easily and quickly.

Another primary object is to provide a hose having a cap or closure which is constructed to direct the water from the booster passage to the perforated passages, and to permit the hose to be flushed out in the event of clogging.

An important object of the invention is to provide a hose having orifices oriented in the arcuate perforated top wall in such a manner as to uniformly and efficiently sprinkle or soak the desired areas.

Another object is to provide a hose that is made of a flexible synthetic resinous material enabling said hose to be coiled for movement from one area to another.

A further object is to provide a hose which may be used as a sprinkler or a soaker with the flat bottom wall down and which may also be used as a soaker by turning the flat bottom wall up.

The foregoing objects and advantages of the present invention, together with various other objects and advantages which will become apparent, may be attained with the exemplary embodiment of the invention illustrated in the accompanying drawing and described in detail hereinafter. Referring to the drawing:

Fig. 1 is a top plan view of a hose section, broken intermediate its ends, embodying the invention;

Fig. 2 is a vertical, cross-sectional view taken along line 2—2 of Fig. 1;

Fig. 3 is a vertical, longitudinal, sectional view taken along line 3—3 of Fig. 1;

Fig. 4 is a vertical, cross-sectional view taken along line 4—4 of Fig. 3; and

Fig. 5 is an exploded view somewhat similar to Fig. 1, but also illustrates the coupling means of two adjacent hose sections.

Referring particularly to Fig. 1 of the drawing, the numeral 1 generally designates a hose section embodying this invention. The hose is composed of three main portions, namely a central flexible tube 2, a female coupling 3 and a complementary male coupling 4 connected to each end of said tube. These couplings will be described more in detail in connection with Figs. 3 and 5.

Referring now to Fig. 2, the tube 2 is made of a flexible synthetic resinous material, preferably plasticized polyvinyl chloride, which facilitates coiling the hose for movement from one sprinkling or soaking area to another. This material is, of course, water-impervious so that no water will escape therefrom except at the proper orifices. The hose portion is illustrated as an integral unit, and is preferably made by extruding the plastic resinous material through a die.

The tube 2 comprises an outer shell having a flat bottom wall 5 and an arcuate perforated top wall 6 spanning from one edge of said bottom wall to the other. The flat bottom wall has the advantages of forming a firm, broad support to orientate the jets of water issuing from the arcuate top wall 6 with respect to the ground and to prevent undesirable twisting and turning of the hose during use. The arcuate top wall 6 is composed of three portions, a central portion 6a having orifices 8, 9 and 10, and two side portions 6b and 6c having orifices 7 and 11 respectively. It will also be noted upon reference to Fig. 1 that each portion has a plurality of perforations extending therethrough. These perforations are preferably formed as longitudinal slits cut by steel needles projecting from the cylindrical surface of a roller; the slits open up under water pressure to form curved orifices which extend longitudinally of the hose section to produce the water jets. The arcuate construction of the top wall 6 provides for the proper transverse direction of the jets as shown by the straight dot-dash lines of Fig. 2. To further illustrate this point, suppose that the top wall was not curved as shown, but the portion 6a was horizontal and straight, and the portions 6b and 6c were vertical and straight. It is obvious that the direction of the jets through orifices 7, 8, 10 and 11 could not be controlled in the manner shown because the jets issue from the orifices in a direction normal to the surface surrounding the orifices. The direction of the jets cannot be otherwise, because the walls of the hose are very thin and the throats of the orifices therein are too short to control the direction.

Another advantage of the arcuate top wall structure is its continuous curvature which is free from longitudinal channels which may collect the water and discharge it in rivulets at lateral points along the hose. The external surfaces of the intermediate wall portions 6a—b and 6a—c formed by the intersections of wall portions 6a with each of 6b and 6c are not sufficiently concave (as viewed in Fig. 1 and from the top of Fig. 2) to collect water from the jets. The top and side portions slope sufficiently to allow the water to flow freely to the ground.

Within the shell of the tube 2 and integral therewith is a partitioning wall structure which extends upwardly from the intermediate portions of the bottom wall 5 to the intermediate portions 6a—b and 6a—c of the arcuate top wall 6. Said structure comprises two upwardly extending, angularly shaped partition walls 12 and 13 which are joined together at points intermediate their ends by a partition wall 14 extending transversely between them. As will readily be seen, the shell is divided into a plurality of longitudinal passages by the partitioning structure, which also reinforces such shell to resist deformation thereof while the hose is under water pressure. This is illustrated by the fact that any undesirable internal pressure tending to bulge top wall 6 and bottom wall 5 outwardly will be counteracted by partitions 12 and 13 which are in turn reinforced by a partition 14.

The longitudinal passages formed in the shell comprise two side passages, 15, 16, a central upper passage 17, and a central lower booster passage 18. As shown in Fig. 3, these passages are connected at one end within the coupling 3, which may be connected in the usual manner to a suitable source of water supply (not shown). The opposite ends of the passages 15, 16, 17 and 18 are connected to the male coupling 4 in an identical manner. Each end of the shell extends beyond the partitioning structure thereby permitting said passages to communicate with each other but only at their respective ends. This construction provides for separate and independent water flow passages in which the water pressure is equalized at any transverse section, such as Fig. 2 for example. The reinforcing partitions 12, 13 and 14, and this substantial balance of pressure thereon will tend to prevent the water from causing any undesirable deformation of the hose and will provide for a substantially uniform transverse intensity of the jets at any such section to uniformly sprinkle or soak the desired areas.

Referring once again to Fig. 2 it will be seen that the walls of the central lower booster passage 18 are imperforate whereas the arcuate top wall 6 is perforated by the various orifices extending therethrough to the passages 15, 16 and 17. Water will thus flow completely through the passage 18 from the inlet end of the hose section to the other end before being distributed to the perforated passages. The resulting advantage of such a structure lies in boosting the pressure adjacent the end of the hose section remote from the source of fluid supply, thereby providing a more uniform intensity of jets throughout the length of the hose, with a maximum volume of delivery of water under lower water supply pressures.

Referring back to Fig. 1, it will be observed that the various orifices are orientated longitudinally of the tube 2 in a definite pattern. Reading from left to right the sequence of orifices is 7, 11, 9, 7, 11, 8, 10 and this sequence is repeated throughout the length of the tube. By referring to both Figs. 1 and 2 it will be seen that this orientation provides a uniform distribution of jets both longitudinally and transversely of the hose so that large areas immediately adjacent and on each side of the hose are adequately sprinkled or soaked. It will further be noted that there will be no interference between the various jets during sprinkling, because of their staggered spacing and because the jets do not diverge into sprays until they reach the downward part of their trajectory. The jets are so positioned that the sprays will overlap slightly for positive coverage. As a result, the sprinkling and soaking efficiency of the hose is maintained at a high level.

In the manufacturing of the hose 1, the flexible tube 2 is formed in long lengths by extruding a synthetic resin, preferably a plasticized polyvinyl chloride, through a die adapted to form the cross-section shown in Fig. 2. The extruded tube is cut to the desired length and the couplings 3 and 4 are assembled thereon as shown in Fig. 3. In assembling the couplings 3 and 4 on the ends of the tube 2, the reinforcing partitions 12, 13 and 14 are cut out of the outer shell so that each end thereof, comprising the arcuate top wall 6 and bottom wall 5, extends beyond said partitions for a distance substantially equal to the length of a tubular metal shank 19, which is to be inserted within the outer shell of the tube 2. The end of the shank 19 of the female coupling 3 is provided with an external annular boss 20 and a flange 21 between which is formed a groove 22, which provides a swivel connection for an internally threaded nut 23 having an internal annular flange 24 extending into the groove.

The shank 19 is inserted within the extended end of the shell of the tube 2 until the annular boss 20 abuts against the end of the shell and the other end of the shank 19 lies adjacent the partitions. However, before the tubular shank 19 is inserted, a tubular metal ferrule 25 is slipped over the end of the tube and pushed beyond the inner end of the shank 19, and after the shank 19 has been inserted, the ferrule 25 is pushed towards the end of the tube 2 against the annular boss 20. The extended end of the outer shell of the tube 2 is now securely clamped between the shank 19 and the outside ferrule 25 by placing an expanding tool within the shank and expanding it outwardly against the shell. The expansion is sufficient to seal and secure the hose in the coupling.

In the coupling 3 as thus assembled in Fig. 3, the inner end 26 of the ferrule 25 projects beyond the inner end of the shank 19 and overlaps the reinforcing partitions 12, 13 and 14. The end 26 of the ferrule is also provided with an outwardly flared annular flange 27. The overlapping end 26 of the ferrule reinforces the tube 2 against the internal pressure of the water therein and relieves the ends of the partitioning walls from strains under the internal pressure of the water in the hose. This construction prevents the ends of the partitions from splitting, where they are weakest, and the flared flange 27 prevents the tube 2 from being cut when it bulges outwardly under the water pressure, or when the tube is flexed at the coupling.

The male coupling 4 is assembled on the opposite end of the tube 2 from the female coupling 3 in the same manner as the female coupling 3. Referring to Fig. 5 the internal tubular shank, which corresponds to the female tubular shank 19, is provided with an expanded externally threaded head 28 and an external annular boss 29. The shell of the tube 2 is clamped between the internal shank (corresponding to the shank 19 of the female coupling 3) and an external ferrule 30 which abuts against the annular boss 29 on the internal shank.

The sprinkler hose may be used as a single length, or section, as shown in Fig. 1. In this case, an end cap or closure 31 is screwed onto the threaded head 28 of the male coupling 4 to close that end of the hose, and the female connector 3 is connected to the source of water supply. In the event it is desired to connect two or more sections of the sprinkler hose together in series to form a long hose, the male and female couplings of individual sections are connected together as indicated by the exploded view of Fig. 5, and the tail end of the hose is provided with a closure or cap 31 as shown in Fig. 1. The cap 31 serves the purposes of closing the tail end of the hose, of directing the water from the booster passage 18 to the perforated passages 15, 16 and 17 and of making the hose sections identical and interchangeable when the cap is removed from the male coupling 4. By making the cap 31 removable, the hose has the further advantage in that it may be flushed out when the cap is so removed, whereby any solid particle such as silt, dirt or sand may be discharged from the inside of the hose so as to prevent such particles from clogging the jet orifices 7—11.

Another advantage of the hose is that it may readily be used as a sprinkler or soaker. In the former use, the hose is positioned with the flat bottom wall down on the ground and with the volume of water delivery at a relatively high level. In use as a soaker, the water volume is greatly reduced and at least two positions are available. The first position is the same as that for sprinkling while in the second position the bottom wall is turned up and the top wall rests against the ground.

Although only one exemplary embodiment of the invention has been disclosed it will be understood that various changes, modifications, and substitutions may be incorporated in said embodiment without departing from the spirit of the invention as defined in the appended claims.

Having thus described our invention, what we claim and desire to protect by Letters Patent is:

1. A sprinkler hose comprising a flexible synthetic resinous tube having an outer shell divided into a plurality of longitudinal passages and reinforced by a longitudinal partitioning structure, said shell having a flat bottom wall and an arcuate top wall spanning from one edge of said bottom wall to the other, said partitioning structure extending upwardly from said flat bottom wall to said arcuate top wall and forming therebetween a passage having imperforate walls, and said arcuate top wall having a plurlity of jet orifices extending therethrough to each of the passages formed in part by said arcuate top wall.

2. A sprinkler hose as in claim 1, wherein each end of said outer shell extends beyond said partitioning structure, a female coupling secured to one of said extended ends of said outer shell, and a complementary male coupling secured to the other of said extended ends of said shell.

3. A sprinkler hose as in claim 2 wherein said couplings have ferrules overlapping said partitioning structure to prevent splitting of said structure.

4. A sprinkler hose as in claim 2 wherein each of said couplings comprises a shank within said extended end and adjacent said partitioning structure, a ferrule surrounding said extended end and overlapping said partitioning structure to prevent splitting of said structure, said extended end being securely clamped between said ferrule and said shank.

5. A sprinkler hose comprising a tube composed of a flexible, synthetic resinous, water-impervious material, said tube comprising an outer shell divided into a plurality of longitudinal passages and reinforced by partitions, said shell having a flat bottom wall and an arcuate top wall spanning between the opposite edges of said bottom wall, two of said partitions extending upwardly from the intermediate portions of said flat bottom wall to the intermediate portions of said arcuate top wall, another of said partitions extending transversely between said upwardly extending partitions whereby central upper and lower passages are formed between said upwardly extending partitions and side passages are formed on opposite sides of said upper and lower passages, said arcuate top wall having a plurality of jet orifices extending therethrough to said central upper and side passages, said partitions and bottom wall being imperforate, a coupling adapted to connect all of said passages to a source of water supply, at one end, and said lower passage being connected to said other passages at its opposite end.

6. A sprinkler hose as in claim 5 wherein each end of said outer shell extends beyond said partitions, a female coupling secured to one of said extended ends of said outer shell, a complementary male coupling secured to the other of said extended ends of said outer shell, and a closure for said male coupling.

7. A sprinkler hose as in claim 6 wherein said couplings have ferrules overlapping said partitions to prevent splitting of said partitions.

8. A sprinkler hose as in claim 6 wherein each of said couplings comprises a shank within said extended end and adjacent said partitions, a ferrule surrounding said extended end and overlapping said partitions to prevent splitting of said partitions, said extended end being securely clamped between said ferrule and said shank.

References Cited in the file of this patent

UNITED STATES PATENTS

| 800,136 | Brown | Sept. 26, 1905 |
| 2,566,833 | Healy | Sept. 4, 1951 |
| 2,621,075 | Sedar | Dec. 9, 1952 |

FOREIGN PATENTS

| 773,584 | France | Nov. 21, 1934 |